United States Patent
Aikawa et al.

(10) Patent No.: US 6,282,422 B1
(45) Date of Patent: Aug. 28, 2001

(54) RADIO COMMUNICATION APPARATUS AND METHOD WITH SINGLE RECEIVER

(75) Inventors: Hideto Aikawa; Akihiro Shibuya; Youichi Moritani, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/260,518

(22) Filed: Mar. 2, 1999

(30) Foreign Application Priority Data

May 29, 1998 (JP) .................................................. 10-150441

(51) Int. Cl.[7] ...................................................... H04Q 7/20
(52) U.S. Cl. .................. 455/436; 455/150.1; 455/154.1; 455/158.1; 455/3.04; 375/356; 375/316
(58) Field of Search ..................................... 455/403, 421, 455/422, 432, 436, 439, 73, 76, 77, 3.04, 550, 150.1, 154.1, 158.3, 437; 375/311, 335, 340, 349, 354, 356, 364, 365

(56) References Cited

U.S. PATENT DOCUMENTS

| | | | |
|---|---|---|---|
| 3,981,015 | * 9/1976 | Phipps | 343/105 R |
| 4,110,695 | * 8/1978 | Klank et al. | 325/464 |
| 4,144,414 | * 3/1979 | Nicholas | 179/15 |
| 4,228,540 | * 10/1980 | Ogita | 455/158 |
| 6,011,955 | * 1/2000 | Tsuchiyama | 455/38.4 |
| 6,154,652 | * 11/2000 | Park et al. | 455/437 |

FOREIGN PATENT DOCUMENTS 63-115428    5/1988   (JP) .
9-284827    10/1997   (JP) .

* cited by examiner

*Primary Examiner*—William G. Trost
*Assistant Examiner*—Congvan Tran (57) ABSTRACT

A radio communication apparatus capable of solving a problem involved in a conventional apparatus in that in addition to a first receiver, a second receiver must be provided for establishing synchronization with a contiguous base station, which causes an increase in a circuit scale and consumed power of a mobile station. The present radio communication apparatus switches, when carrying out hand-off from the current base station to a contiguous base station, a receiving frequency of a receiver from the frequency of the current base station to that of the contiguous base station, and a counter to be corrected by a synchronization manager from a first counter to a second counter that is used to establish synchronization with the contiguous base station.

12 Claims, 6 Drawing Sheets

RADIO COMMUNICATION APPARATUS AND METHOD WITH SINGLE RECEIVER

BACKGROUND OF THE INVENTION

1. Field of the Invention

The present invention relates to a radio communication apparatus and a radio communication method for performing radio communications between a mobile station and a plurality of base stations that constitute communication zones.

2. Description of Related Art

Figure 6:
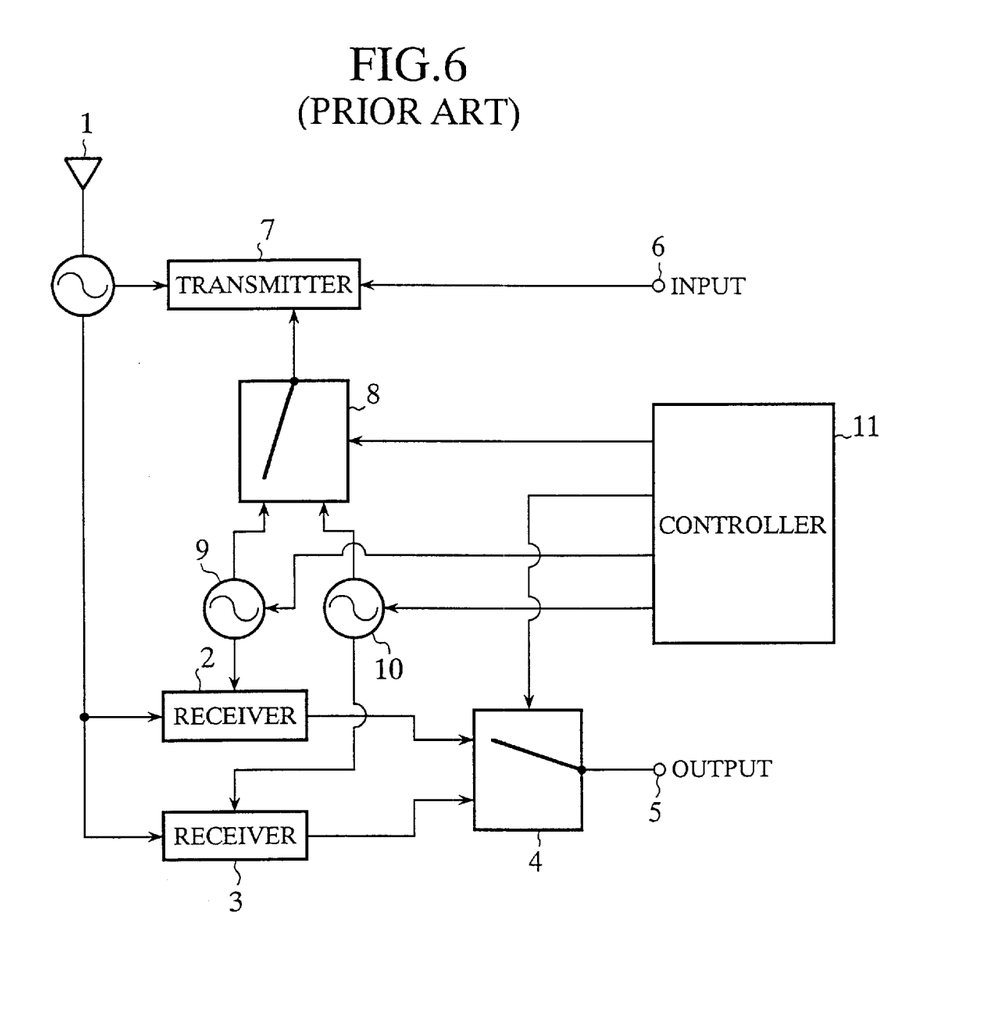
FIG. 6 is a block diagram showing a configuration of a conventional radio communication apparatus.

FIG. 6 is a block diagram showing a conventional radio communication apparatus disclosed in Japanese patent application laid-open No. 63-115428/1988, for example. In FIG. 6, the reference numeral 1 designates an antenna of a mobile station; reference numerals 2 and 3 each designate a receiver for receiving data transmitted from a base station; reference numeral 4 designates a switch for connecting one of the receivers 2 and 3 to an output terminal 5; 6 designates an input terminal; 7 designates a transmitter for transmitting data of the mobile station to the base stations; 8 designates a switch for connecting one of synthesizers 9 and 10 to the transmitter 7; 9 designates a synthesizer for establishing a receiving frequency of the receiver 2 and a transmitting frequency of the transmitter 7; 10 designates a synthesizer for establishing a receiving frequency of the receiver 3 and a transmitting frequency of the transmitter 7; and 11 designates a controller for controlling the oscillation frequencies of the synthesizers 9 and 10, and the connections of the switches 4 and 5.

Next, the operation of the conventional communication apparatus will be described.

First, the controller 11 connects the switch 4 to the receiver 2 and the switch 8 to the synthesizer 9 as shown in FIG. 6 to tune the receiving frequency of the receiver 2 at a transmitting frequency of the corresponding base station and the transmitting frequency of the transmitter 7 at a receiving frequency of the base station.

This makes it possible for the mobile station to exchange data between the base station using the receiver 2 and the transmitter 7. However, if the mobile station roams out of the communication zone of the base station during the communications, the data exchange with the base station will become impossible. To avoid such a situation, the mobile station must establish synchronization with a contiguous base station before the data exchange becomes impossible, and perform handoff from the current base station to the contiguous base station.

However, since the handoff is carried out by establishing synchronization with the contiguous base station while maintaining communications with the base station connected through the current link, it will cause a hit (instantaneous interruption) of the voice or data during the communications.

To reduce the duration of the hit of the voice or data to a minimum in the conventional example, the current base station notifies the mobile station of the channel number of the contiguous base station in advance.

When the receiver 2 of the mobile station receives the channel number of the contiguous base station while continuing the communications with the current base station without changing the receiving frequency of the receiver 2 and the transmitting frequency of the transmitter 7, the controller 11 controls the synthesizer 10 to tune the receiving frequency of the receiver 3 at the frequency corresponding to the channel number of the contiguous base station.

This makes it possible for the receiver 3 to receive the data transmitted from the contiguous base station, to measure the receiving level of the data, and thus to establish the synchronization with the contiguous base station.

Subsequently, when the receiver 2 receives a handoff command from the current base station, the controller 11 connects the switch 4 to the receiver 3 and the switch 8 to the synthesizer 10, thereby carrying out switching of the communications from the current base station to the contiguous base station.

With such a configuration, although the conventional radio communication apparatus can reduce the duration of the hit of the voice or data during the handoff to a minimum, it has a problem of increasing the circuit scale and power consumption of the mobile station because it includes both the receiver 2 and the receiver 3 for establishing the synchronization with the contiguous base station.

SUMMARY OF THE INVENTION

The present invention is implemented to solve the foregoing problem. It is therefore an object of the present invention to provide a radio communication apparatus and a radio communication method for reducing the duration of the hit of the voice or data to a minimum with only a single receiver.

According to a first aspect of the present invention, there is provided a radio communication apparatus comprising: receiving means for receiving data transmitted from a base station; at least two counters, each of which counts an elapsed time, and resets its count value when it reaches a preset value; a timing generator for generating a timing signal when the count value of one of the two counters reaches a specified value; a detector for detecting, in response to the timing signal, a unique word in the data received by the receiving means; synchronization establishing means for correcting, when the detector detects the unique word, one of the count value and the preset value of one of the two counters to shift an output timing of the timing signal to establish synchronization with the base station; and switching means for switching, when switching from the current base station to a contiguous base station, a receiving frequency of the receiving means from a frequency of the current base station to a frequency of the contiguous base station, and for switching a counter to be corrected by the synchronization establishing means from a first counter to a second counter of the two counters.

Here, each of the at least two counters may increment its count value in accordance with the elapsed time.

Each of the at least two counters may decrement its count value in accordance with the elapsed time.

The switching means may return the frequency of the receiving means from the frequency of the contiguous base station to the frequency of the current base station, and may return the counter to be corrected by the synchronization establishing means from the second counter to the first counter when one of three events takes place, the three events being an establishment of synchronization with the contiguous base station, a command to end searching for a contiguous channel, and a time out.

The switching means may switch, when receiving a handoff command from the current base station, the frequency of the receiving means from the frequency of the current base station to the frequency of the contiguous base station, and the counter to be corrected by the synchronization establishing means from the first counter to the second counter, again.

The switching means may switch, when synchronization with the contiguous base station has been established, the frequency of the receiving means from the frequency of the contiguous base station to a frequency of another contiguous base station, and may store into a memory a relative value between the count values of the two counters every time the synchronization has been established with the contiguous base stations.

The synchronization establishing means may calculate, when the unique word is detected, an average value of a latest count value and one or more previous count values of one of the two counters, and change the count value of the counter to the average value.

According to a second aspect of the present invention, there is provided a radio communication method comprising the steps of: receiving data transmitted from a base station; generating a timing signal when a count value of one of at least two counters reaches a specified value, each of the two counters counting an elapsed time, and resetting its count value when it reaches a preset value; detecting, in response to the timing signal, a unique word in the data received; correcting, when the unique word is detected, one of the count value and the preset value of one of the two counters to shift an output timing of the timing signal to establish synchronization with the base station; and switching, when switching from the current base station to a contiguous base station, a receiving frequency of the data from a frequency of the current base station to a frequency of the contiguous base station, and for switching a counter to be corrected from a first counter to a second counter of the two counters.

Here, the step of switching may comprise the steps of returning the receiving frequency of the data from the frequency of the contiguous base station to the frequency of the current base station, and returning the counter to be corrected from the second counter to the first counter when one of three events takes place, the three events being an establishment of synchronization with the contiguous base station, a command to end searching for a contiguous channel, and a time out.

The step of switching may comprise the step of switching, when receiving a handoff command from the current base station, the frequency of receiving the data from the frequency of the current base station to the frequency of the contiguous base station, and the counter to be corrected from the second counter to the first counter.

The step of switching may comprise the steps of switching, when synchronization with the contiguous base station has been established, the receiving frequency of the data from the frequency of the contiguous base station to a frequency of another contiguous base station, and storing into a memory a relative value between the count values of the two counters every time the synchronization has been established with the contiguous base stations.

The step of correcting may comprise the steps of calculating, when the unique word is detected, an average value of a latest count value and one or more previous count values of one of the two counters, and changing the count value of the counter to the average value.

DETAILED DESCRIPTION OF THE PREFERRED EMBODIMENTS

The invention will now be described with reference to the accompanying drawings.

Embodiment 1

Figure 1:
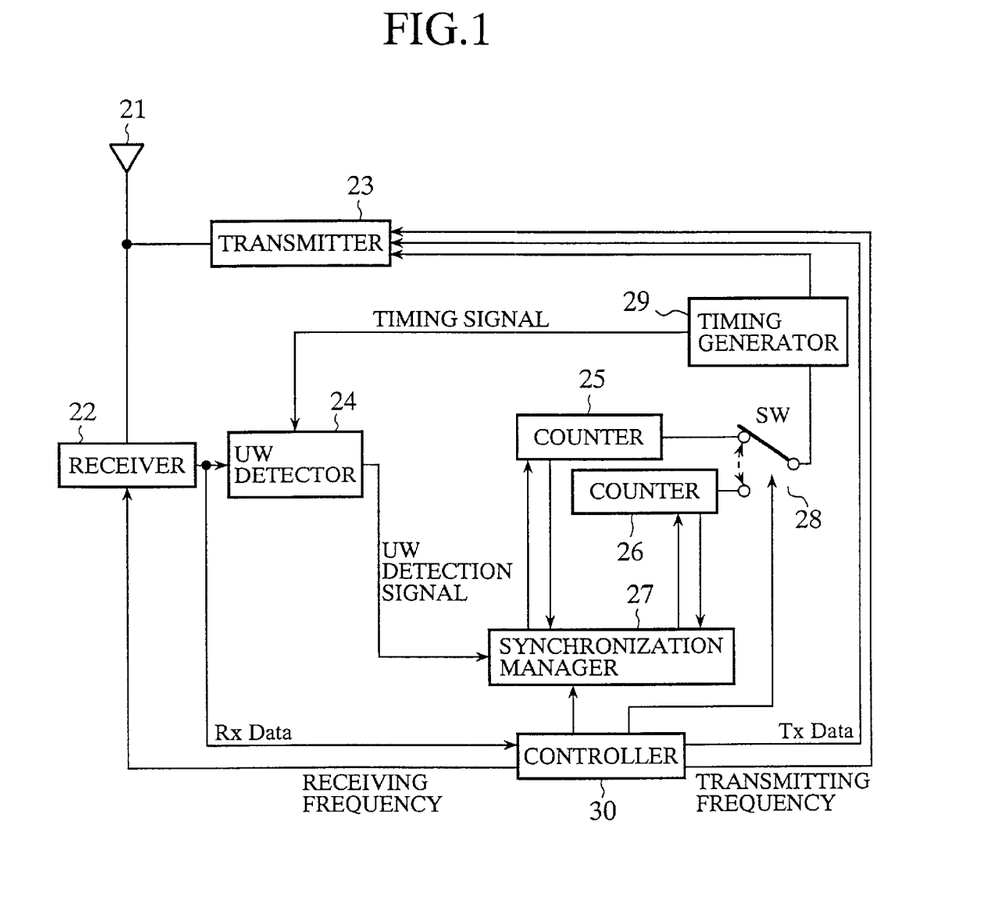
FIG. 1 is a block diagram showing an embodiment 1 of a radio communication apparatus in accordance with the present invention.

FIG. 1 is a block diagram showing an embodiment 1 of a radio communication apparatus in accordance with the present invention. In FIG. 1, the reference numeral 21 designates an antenna of a mobile station; 22 designates a receiver for receiving data transmitted from base stations; 23 designates a transmitter for transmitting data to the base stations; 24 designates a unique word (UW) detector for generating a unique word detection signal when detecting a unique word in the data received by the receiver 22; and reference numerals 25 and 26 each designate a counter for incrementing its count value in accordance with an elapsed time, and for resetting the count value to zero when it reaches a preset value (600, for example).

The reference numeral 27 designates a synchronization manager for correcting the count value or preset value of the counter 25 or 26 when the UW detector 24 outputs the unique word detection signal; 28 designates a switch; 29 designates a timing generator for producing a timing signal when the count value of the counter 25 or 26 reaches a specified value (five, for example); and 30 designates a controller that controls, when carrying out handoff from the current base station to a contiguous base station, the switching of the receiving frequency of the receiver 22 from the frequency of the current base station to the frequency of the contiguous base station, as well as the switching of the counter to be corrected by the synchronization manager 27, and that connects the transmitted and received data to a higher layer.

Figure 2:
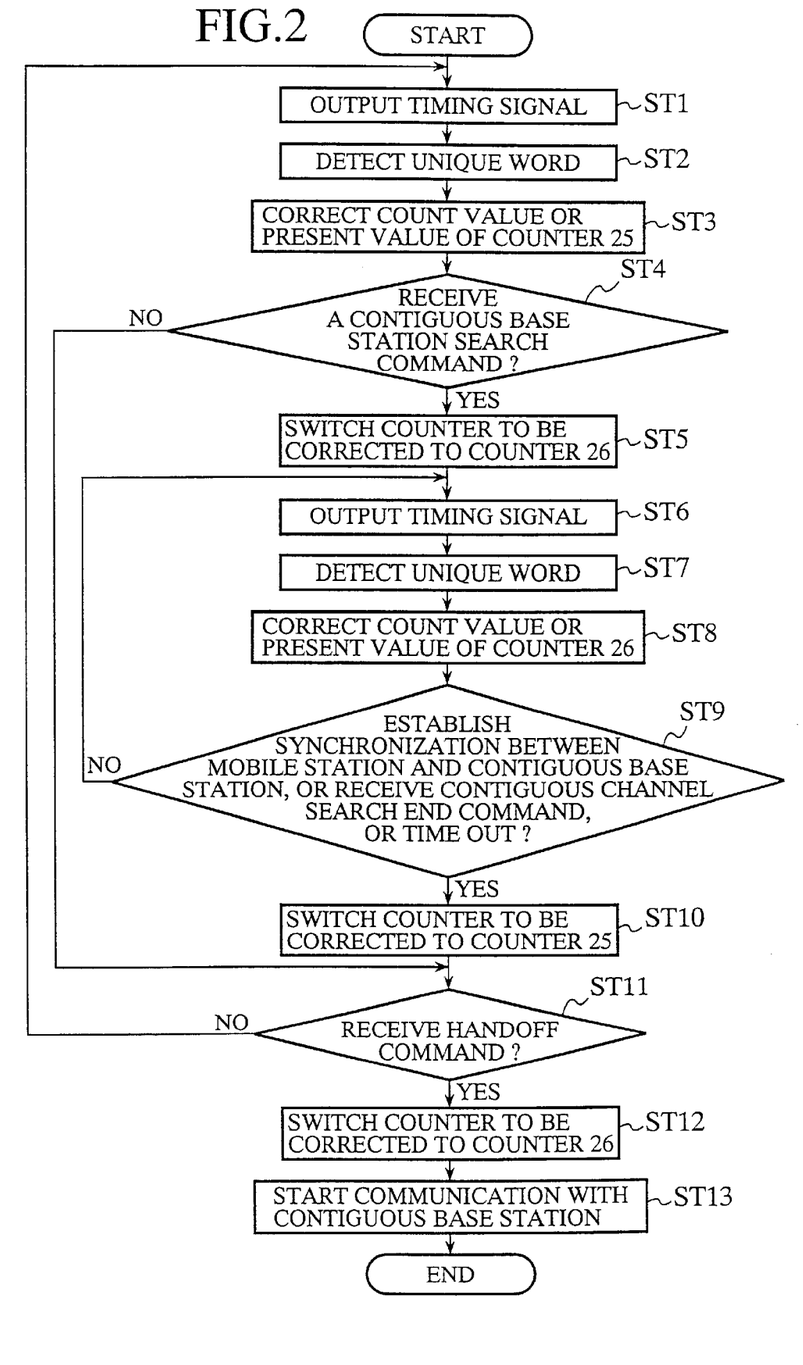
FIG. 2 is a flowchart illustrating a radio communication method of the embodiment 1 in accordance with the present invention.

Next, the operation of the present embodiment 1 will be described with reference to the flowchart illustrating a radio communication method of the present embodiment 1.

First, although the mobile station can carry out radio communications with the base station when the receiving frequency of the receiver 22 is set at a transmitting frequency of the base station and the transmitting frequency of the transmitter 23 is set at a receiving frequency of the base station, unless the synchronization is established between the mobile station and the base station, the mobile station cannot extract required data from the data transmitted from the base station and received by the receiver 22, because the mobile station cannot recognize the initial slot or the like of the received data.

To establish the synchronization between the mobile station and the base station, the timing generator 29 outputs, when the switch 28 is connected to the counter 25, the timing signal at step ST1 when the count value of the counter 25 reaches the specified value (five, for example).

Receiving the timing signal from the timing generator 29, the UW detector 24 searches for the unique word included in the data transmitted from the base station, and outputs the unique word detection signal when it detects the unique word at step ST2. The unique word detection signal can include unique word error information or unique word reliability information: the former represents the deviation of the initial slot position calculated from the detected position of the unique word with respect to the initial slot position notified by the timing signal; and the latter represents, when the correlation detection between the unique words is carried out, the reliability of a decision made from a correlation value whether the detection is reliable or not.

While the synchronization is not yet established (asynchronous condition), the UW detector 24 searches the received data for the unique word independently without using is "5" and the preset value is "600" as in the foregoing case, the preset value is corrected to "595", which causes the counter 25 to be reset to zero when its count value reaches "595".

Furthermore, when the unique word detection signal contains the unique word error information and unique word reliability information, the synchronization manager 27 can carry out the following corrections. If the unique word reliability information indicates that the unique word detection is reliable and the unique word error information indicates that the error is zero, the synchronization manager 27 can carry out the correction of the count value of the counter 25 considering the clock deviation, and notifies the counter 25 of the correction. If the unique word reliability information indicates that the unique word detection is reliable but the unique word error information includes a particular nonzero value, the synchronization manager 27 can carry out the correction of the count value considering errors of the present and past unique word positions, as well as the clock deviation. If the synchronization manager 27 makes a decision that the unique word detection is not reliable from the unique word reliability information, it can carry out the correction considering only the clock deviation.

Repeating the correction in this way, the synchronization manager 27 cancels out the count value deviation, thereby establishing the synchronization. Subsequently, as a preparation for the mobile station to roam out of the communication zone of the base station, the controller 30 switches, in response to a search command of a contiguous base station sent from the current base station the timing signal from the timing generator 29, and produces the unique word detection signal when it detects the unique word.

Here, the position at which the unique word is embedded into the received data is fixed.

Receiving the unique word detection signal from the UW detector 24, the synchronization manager 27 acquires the count value from the counter 25 at that time, and compares it with the previous count value. If the two count values agree with each other, a decision is made that the detection timing of the current unique word agrees with that of the previous unique word, and hence no synchronization deviation takes place. Thus, the correcting processing of the count value of the counter 25 is not carried out. In contrast, when the current count value does not agree with the previous count value, a decision is made that the detection timing of the current unique word does not agree with that of the previous unique word, and hence the synchronization deviation takes place. Thus, the correcting processing of the count value of the counter 25 is carried out at step ST3.

More specifically, if the current count value is "30" and the previous count value is "35", the average value of the two count values is obtained so that the count value of the counter 25 is corrected to the average value "33". (Alternatively, the average value can be obtained by averaging the current and two previous count values).

Incidentally, although the count value of the counter 25 is corrected here, the preset value for resetting the counter 25 can be corrected instead without correcting the count value. For example, if the error of the count value at step ST4, the receiving frequency of the receiver 22 to a channel number of the contiguous base station, and the connection of the switch 28 from the counter 25 to the counter 26. In addition, the controller 30 issues to the synchronization manager 27 a command to change the counter whose count value is to be corrected from the counter 25 to the counter 26 at step ST5.

Here, the mobile station can set a contiguous base station search command timer in response to the contiguous base station search command.

Figure 3:
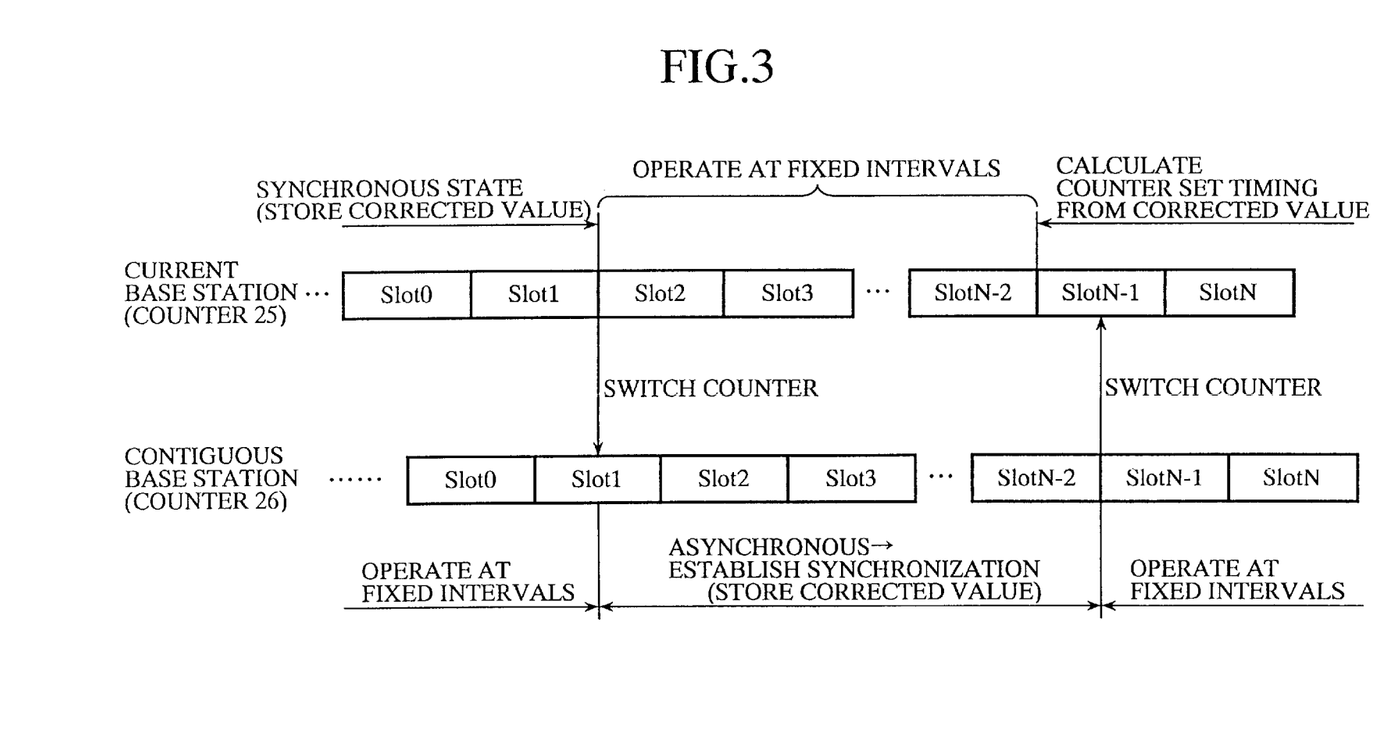
FIG. 3 is a diagram illustrating adjacent channel monitoring for a contiguous base station.

In response to the contiguous base station search command, the synchronization manager 27 starts the correcting processing of the count value or preset value of the counter 26 as illustrated in FIG. 3, and the timing generator 29 outputs the timing signal in accordance with the count value of the counter 26, thereby establishing the synchronization between the mobile station and the contiguous base station through steps ST6–ST8.

In this case, even after the counter to be corrected by the synchronization manager 27 is changed to the counter 26, the counter 25 continues the increment and reset operation of the count value. Thus, the synchronization state between the mobile station and the current base station is maintained.

When the synchronization has been established between the mobile station and the contiguous base station, or a contiguous base station search end command or a time out takes place at step ST9, the controller 30 returns the receiving frequency of the receiver 22 to the transmitting frequency of the current base station, and returns the connection of the switch 28 from the counter 26 to the counter 25. In addition, it issues to the synchronization manager 27 a command to return the counter whose count value is to be corrected from the counter 26 to the counter 25 at step ST10.

In this case, even after the counter to be corrected by the synchronization manager 27 is changed to the counter 25, the counter 26 continues the increment and reset operation of the count value. Thus, the synchronization state between the mobile station and the contiguous base station is maintained.

When the controller 30 receives from the current base station the handoff command at step ST11, it changes the receiving frequency of the receiver 22 to the transmitting frequency of the contiguous base station, and the transmitting frequency of the transmitter 23 to the receiving frequency of the contiguous base station.

Furthermore, the controller 30 switches the connection of the switch 28 from the counter 25 to the counter 26, and provides the synchronization manager 27 with a command to change the counter whose count value is to be corrected from the counter 25 to the counter 26 at step ST12.

Figure 4:
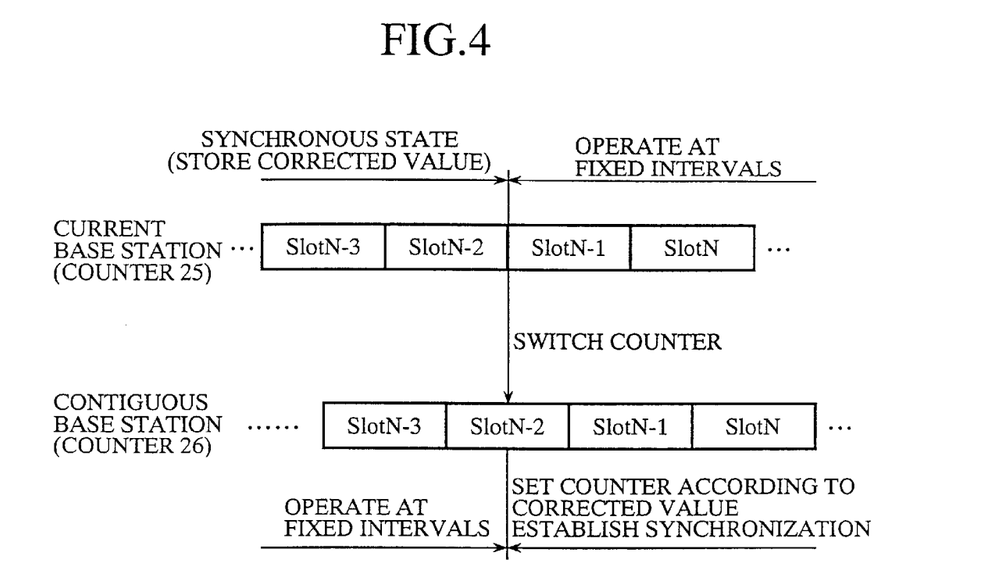
FIG. 4 is a diagram illustrating a handoff operation.

Thus, as illustrated in FIG. 4, the mobile station starts communications with the contiguous base station, in which case, the mobile station can start the communications with the contiguous base station without delay at step ST13 because the synchronization state between them is maintained as described above.

As described above, the present embodiment 1 is configured such that it switches not only the counter to be corrected by the synchronization manager 27, but also the receiving frequency of the receiver 22 to the frequency of the contiguous base station when it performs the handoff from the current base station to the contiguous base station. This offers an advantage of being able to reduce the duration of the hit of the voice or data to a minimum without providing two receiving systems.

Embodiment 2

Although the foregoing embodiment 1 increments the count values of the counter 25 and 26, they can be decremented, offering the same advantage as the foregoing embodiment 1.

Embodiment 3

Figure 5:
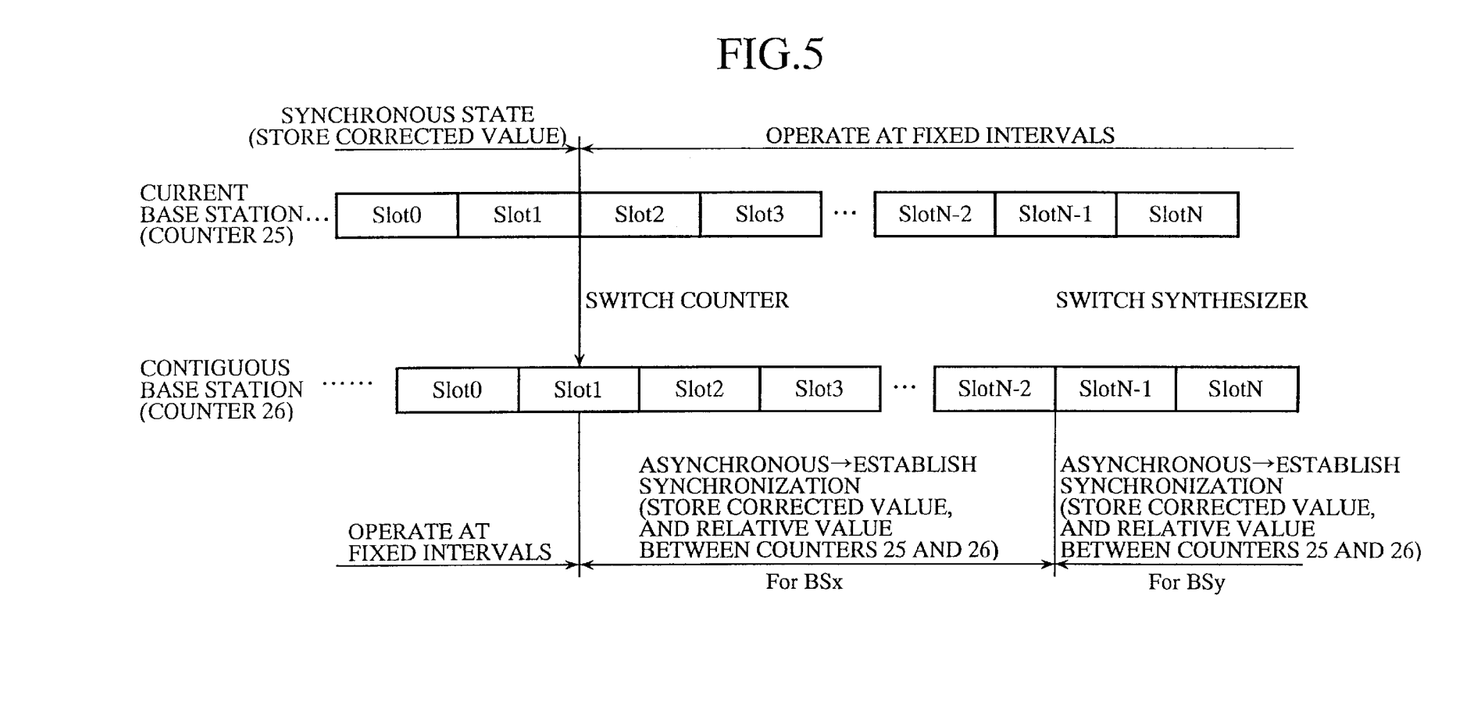
FIG. 5 is a diagram illustrating adjacent channel monitoring for a plurality of contiguous base stations.

Although the mobile station establishes synchronization with a single contiguous base station before the handoff in the foregoing embodiments 1 and 2, it can establish the synchronization with a plurality of contiguous base stations before performing handoff as illustrated in FIG. 5.

More specifically, when the synchronization is established with one of the contiguous base stations as in the foregoing embodiments 1 and 2, the relative value between the counter values of the counters 25 and 26 is stored in a memory.

Likewise, when the synchronization is established with another contiguous base station, the relative value between the counter values of the counters 25 and 26 is stored in the memory.

Subsequently, receiving the handoff command from the current base station, the controller 30 reads from the memory the relative value associated with the contiguous base station to which the handoff is carried out among the plurality of the contiguous base stations, adds the relative value to the count value of the counter 25, and sets the sum to the counter 26 as its count value.

After that, the mobile station starts communications with the contiguous base station using the counter 26.

As described above, the present embodiment 3 is configured such that when it establishes the synchronization with a first contiguous base station, it changes the receiving frequency of the receiver 22 to the frequency of a second contiguous base station, stores the relative count value between the counters 25 and 26, and can establish the synchronization with a plurality of contiguous base stations. This offers an advantage that the mobile station can start communications with the contiguous base station with optimum communication conditions such as a receiving level.

What is claimed is:

1. A radio communication apparatus comprising:
   receiving means for receiving data transmitted from a base station;
   at least two counters, each of which counts an elapsed time, and resets its count value when it reaches a preset value;
   a timing generator for generating a timing signal when the count value of one of said two counters reaches a specified value;
   a detector for detecting, in response to the timing signal, a unique word in the data received by said receiving means;
   synchronization establishing means for correcting, when said detector detects the unique word, one of the count value and the preset value of one of said two counters to shift an output timing of the timing signal to establish synchronization with the base station; and
   switching means for switching, when switching from a current base station to a contiguous base station, a receiving frequency of said receiving means from a frequency of said current base station to a frequency of said contiguous base station, and for switching a counter to be corrected by said synchronization establishing means from a first counter to a second counter of said two counters.

2. The radio communication apparatus as claimed in claim 1, wherein each of said at least two counters increments its count value in accordance with the elapsed time.

3. The radio communication apparatus as claimed in claim 1, wherein each of said at least two counters decrements its count value in accordance with the elapsed time.

4. The radio communication apparatus as claimed in claim 1, wherein said switching means returns the frequency of said receiving means from the frequency of said contiguous base station to that of said current base station, and returns the counter to be corrected by said synchronization establishing means from the second counter to the first counter when one of three events takes place, said three events being an establishment of synchronization with the contiguous base station, a command to end searching for a contiguous base station channel, and a time out.

5. The radio communication apparatus as claimed in claim 4, wherein said switching means again switches, when receiving a handoff command from said current base station, the frequency of said receiving means from the frequency of said current base station to that of said contiguous base station, and the counter to be corrected by said synchronization establishing means from the first counter to the second counter.

6. The radio communication apparatus as claimed in claim 1, wherein said switching means switches, when synchronization with said contiguous base station has been established, the frequency of said receiving means from the frequency of said contiguous base station to that of another contiguous base station, and stores into a memory a relative value between the count values of said two counters every time the synchronization has been established with the contiguous base stations.

7. The radio communication apparatus as claimed in claim 1, wherein said synchronization establishing means calculates, when the unique word is detected, an average value of a latest count value and one or more previous count values of one of said two counters, and changes the count value of the counter to the average value.

8. A radio communication method comprising the steps of:
   receiving data transmitted from a base station;
   generating a timing signal when a count value of one of at least two counters reaches a specified value, each of said two counters counting an elapsed time, and resetting its count value when it reaches a preset value;
   detecting, in response to the timing signal, a unique word in the received data;
   correcting, when the unique word is detected, one of the count value and the preset value of one of said two counters to shift an output timing of the timing signal to establish synchronization with the base station; and
   switching, when switching from a current base station to a contiguous base station, a receiving frequency of the data from a frequency of said current base station to a frequency of said contiguous base station, and for switching a counter to be corrected from a first counter to a second counter of said two counters.

9. The radio communication method as claimed in claim 8, wherein the step of switching comprises the steps of returning the receiving frequency of the data from the frequency of said contiguous base station to the frequency of said current base station, and returning the counter to be corrected from the second counter to the first counter when one of three events takes place, said three events being an establishment of synchronization with the contiguous base station, a command to end searching for a contiguous base station channel, and a time out.

10. The radio communication method as claimed in claim 9, wherein the step of switching comprises the step of switching, when receiving a handoff command from said current base station, the frequency of receiving the data from the frequency of said current base station to the frequency of said contiguous base station, and the counter to be corrected from the second counter to the first counter.

11. The radio communication method as claimed in claim 8, wherein the step of switching comprises the steps of switching, when synchronization with said contiguous base station has been established, the receiving frequency of the data from the frequency of said contiguous base station to a frequency of another contiguous base station, and storing into a memory a relative value between the count values of said two counters every time the synchronization has been established with the contiguous base stations.

12. The radio communication method as claimed in claim 8, wherein said step of correcting comprises the steps of calculating, when the unique word is detected, an average value of a latest count value and one or more previous count values of one of said two counters, and changing the count value of the counter to the average value.

* * * * *